Feb. 1, 1938. S. C. BLISS 2,106,884
SEAL FOR PUMP STRUCTURES
Filed April 3, 1936
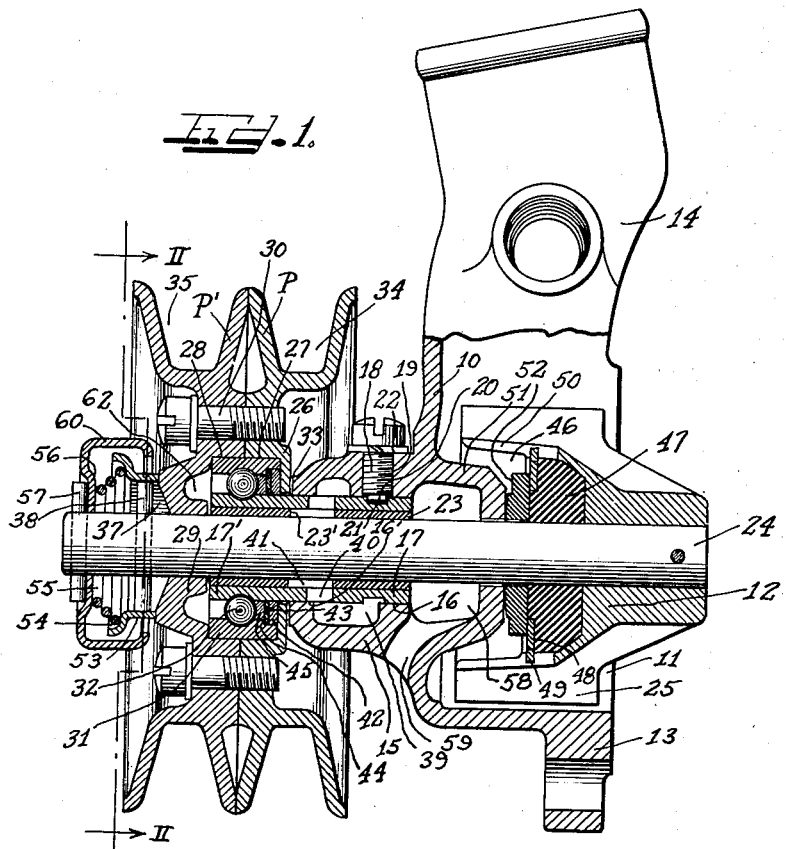
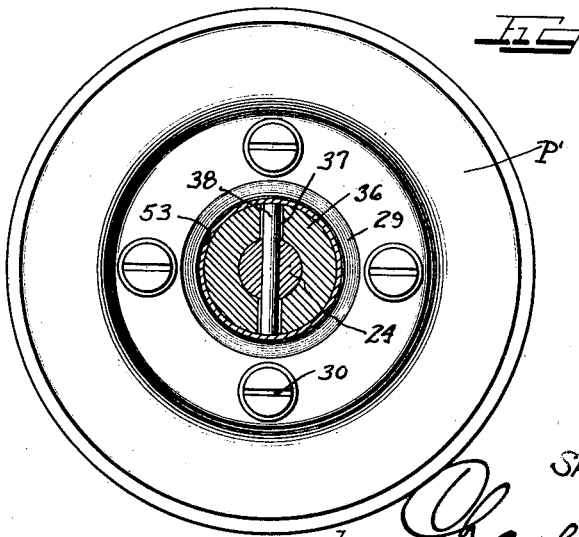
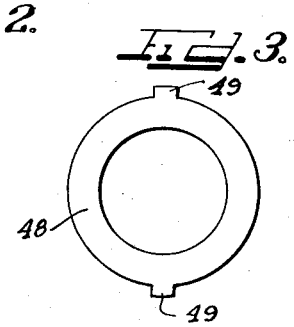
Inventor
SHERWOOD C. BLISS.
by Charles Ortsfield Attys.

Patented Feb. 1, 1938

2,106,884

UNITED STATES PATENT OFFICE 2,106,884

SEAL FOR PUMP STRUCTURES

Sherwood C. Bliss, Buffalo, N. Y., assignor to Houde Engineering Corporation, Buffalo, N. Y., a corporation of New York Application April 3, 1936, Serial No. 72,483

2 Claims. (Cl. 286—7)

My invention relates to pump structures and particularly to improved construction and arrangement in a pump especially adaptable for circulating the cooling medium, such as water, for internal combustion engines.

An important object of the invention is to provide improved bearing support for the drive shaft for the impeller member which creates the cooling fluid circulation, and improved bearing support for the pulley structure by which the shaft is driven.

A further object is to provide improved packing and sealing arrangement for preventing leakage of the cooling fluid to the various bearings and to prevent leakage of bearing lubricant into the cooling fluid.

The above enumerated and other features of the invention are incorporated in the structure disclosed on the drawing, in which drawing:

Figure 1 is a vertical diametral section through the pump structure;

Figure 2 is a sectional view on plane II—II of Figure 1; and

Figure 3 is a plan view of the packing retaining ring.

Referring to the drawing, the pump frame 10 provides the cylindrical pump chamber 11 for the rotor or impeller structure 12, the frame having a flange 13 by which it may be secured to connect the inlet end of the chamber 11 with the cylinder head of an engine (not shown), the frame having the discharge duct 14 for discharge of the cooling fluid from the chamber 11.

The pump frame 10 has a laterally extending boss 15 providing inner and outer annular internal flanges 16 and 16' respectively which support a sleeve 17 having friction fit therewith to be held against rotation. A screw 18 has threaded engagement in the passage 19 through the upper part of the boss, the reduced lower end 20 of the screw projecting into the annular groove 21 in the sleeve 17 so as to prevent longitudinal displacement of the sleeve, a lock washer 22 being preferably interposed between the screw head and the boss.

The sleeve 17 extends a distance outwardly from the outer supporting flange 16' and along its inner and its outer portion the sleeve 17 is lined by bearing bushings 23 and 23' for the shaft 24. At its inner end the shaft is rigidly secured to the rotor or impeller 12 which has the impeller vanes 25 extending therefrom.

I have shown a double pulley structure comprising the pulley members P and P'. The hub 26 of the pulley member P is substantially cylindrical and has the cylindrical cavity 27 which registers with the cavity 28 in the hub 29 of the pulley member P'. Screws 30 engage with the pulley members outside of their hub portions to secure these members rigidly together and to clamp in the hub recesses the outer ring 31 of a ball bearing structure whose inner ring is formed by the projecting end 17' of the sleeve 17, the bearing balls 32 being interposed between the ring and the sleeve end. The hub 29 of the pulley member P' receives the shaft 24, the arrangement being such as to maintain clearance 33 between the inner side of the hub 26 of the pulley member P and the adjacent end of the boss 15. Laterally extending annular flanges on the pulley members provide respectively the belt grooves 34 and 35.

At its outer end the hub 29 of the pulley P' has the cylindrical boss 36 provided with a diametrally extending and axially elongated slot 37 for receiving the end of a drive pin 38 extending through the shaft, the pulley structure being thus secured to the shaft for rotary driving thereof and being journaled by the ball bearings on the outer end 17' of the sleeve 17, there being a slight clearance between the hub 26 of the pulley P and the sleeve.

The space 39 between the sleeve supporting flanges 16 and 16' forms a reservoir for lubricant such as oil or grease. Through ports 40 and the space 41 between the bearing bushings 23 and 23', the lubricant finds its way for lubrication of the bearing surfaces of the bushings and the shaft. Lubricant is also applied in the space 62 in the pulley hub 29 and between the ball bearing rings for lubricating the bearing. To prevent leakage to the exterior along the outer face of the sleeve end 17' suitable packing material may be applied. As shown a gasket or packing material 42 surrounds the sleeve and is compressed between the inner wall of the hub 26 and an abutment ring 43 which abuts a shoulder 44 on the outer bearing ring 31. Packing material 45 may also be interposed between the abutment ring and the balls to be in engagement with the sleeve 17 and the outer bearing ring 31.

On its inner side the body of the rotor member 12 has a recess or pocket 46 surrounding the shaft. In the inner portion of this pocket packing material 47 is applied which packing material may be rubber or other suitable material having elastic properties. Within the recess 46 in front of the packing material is a retainer ring 48 which is preferably flat and of suitable sheet metal. The retainer ring is freely movable axially in the recess 46 and has radial projections 49 thereon for engaging in axially extending slots 50 in the rotor wall surrounding the recess 46 so that the ring will rotate with the rotor and with the shaft.

The pump frame 10 has a boss 51 extending therefrom into the inner end of the recess 46 and between the inner end of this boss and the retainer ring 48 is interposed a washer 52 which may be of fiber, phenol condensation product, or other suitable material or composition. This washer surrounds the shaft but the diameter of its opening is slightly greater than the shaft diameter so that it will be free to rotate or to float between the retainer ring 48 and the adjacent end of the boss 51.

Surrounding the cylindrical boss 36 and the drive pin 38 is a sheet metal ring 53 whose outer end is distended to provide a bearing cup 54 for a spring 55 which surrounds the shaft 24 and abuts a wall 56 surrounding the shaft and which rests against a pin 57 extending through the shaft end. The spring is under compression and as the ring 53 abuts against the hub 29 of the pulley member P the spring will tend to pull the shaft outwardly to move the bottom of the recess 46 in the rotor 12 toward the end of the boss 51, the result being that the packing material 47 is put under compression which acts through the retainer ring 48 against the washer 52 to securely hold the washer against the adjacent end of the boss 51. Preferably the inner diameter of the retainer ring 48 is such that some of the packing material 47 may extend therethrough into engagement with the washer 52. The pressure against the packing material forces it into snug engagement with the walls of the recess 46 and with the shaft and also into snug engagement with the retainer ring and the washer, and as the washer is held intimately against the end of the boss 51 a simple and efficient seal is provided tending to prevent escape of the cooling fluid along the shaft or between the washer and the adjacent end of the boss engaged thereby. Owing to the resiliency and elasticity of the packing 47 the pressure will be uniformly transmitted and the washer will accommodate itself to the plane of the boss surface engaged thereby.

The boss 51 is hollow to provide a collecting chamber 58 around the shaft so that if any cooling fluid should by chance escape past the packing in the rotor it will be intercepted by the chamber 58 and discharged through the outlet 59 to the exterior of the pump structure. Any surplus lubricant which may find its way past the bushing 23 will also be intercepted by the chamber 58 and discharged through the outlet 59 and so will be prevented from reaching the pump chamber.

The abutment wall 56 for the spring 55 may have a circumferential flange 60 extending inwardly therefrom to surround the spring supporting ring 53 so as to make a self-contained unit of the spring assembly and to prevent dust, dirt or other foreign material from finding its way to the shaft bearing.

Should the rotation of the pump rotor be impeded, as for example by freezing of the cooling medium, the pulley and belt structure will be protected against injury by shearing of the drive pin 38. By pulling out the end pin 57 and withdrawing the spring supporting assembly, the broken drive pin may be readily removed and a new pin inserted.

I thus provide a pumping structure which comprises few and simple parts which may be economically manufactured and assembled and in which simple packing means will reduce to a minimum leakage of the pump fluid to the bearings and leakage of bearing lubricant into the pump stream.

Although I have shown a very practical and efficient embodiment of the various features of my invention I do not desire to be limited to the exact construction, arrangement and operation shown and described as changes and modifications may be made without departing from the scope of the invention.

I claim as my invention:

1. In a pump structure of the class described comprising a frame providing a pump chamber and a bearing boss, a shaft structure extending through and journaled in said boss, and a pump rotor within said pump chamber secured to the inner end of said shaft and having a recess surrounding said shaft, sealing structure comprising resilient packing material within the inner portion of said recess, a non-metallic sealing washer surrounding said shaft between said packing material and the adjacent end of said boss, a thin sheet metal retaining washer between said packing material and said sealing washer, said retaining washer being free for axial movement in said recess but having interlocking connections with said rotor for rotation therewith, said retaining washer being of large internal diameter so as to be in intimate engagement with only the peripheral portions of said packing material and the sealing washer, said sealing washer being of slightly larger internal diameter than said shaft so as to be free to rotate relative to the shaft, and spring means arranged to cause the exertion of pressure against said packing material for compression thereof within said recess and around said shaft and for engagement thereof with said sealing washer through the bore of said retaining washer for holding said sealing washer intimately against said bearing boss.

2. In a pump structure of the class described comprising a frame providing a pump chamber and a bearing boss, a shaft structure extending through and journaled in said boss, and a pump rotor within said pump chamber secured to the inner end of said shaft and having a recess surrounding said shaft, sealing structure comprising resilient packing material within the inner portion of said recess, a thin sheet metal retaining washer in said recess in front of said packing material for maintaining said packing material aligned in said recess, said packing material having an annular peripheral recess in its front side for receiving said retaining washer, said retaining washer being free for axial movement in said recess but having interlocking connection with said rotor for rotation therewith, a non-metallic sealing washer between said packing material and the adjacent end of said boss, said sealing washer being free to rotate relative to said shaft, and spring means arranged to cause the exertion of pressure against said packing material for compression thereof within said recess and around said shaft and for engagement thereof with the sealing washer to hold said washer intimately against said bearing boss.

SHERWOOD C. BLISS.